United States Patent
Charaudeau et al.

(10) Patent No.: US 6,708,094 B2
(45) Date of Patent: Mar. 16, 2004

(54) SUSPENSION DEVICE HAVING ELECTRIC ACTUATOR AND SPRING IN PARALLEL

(75) Inventors: Jean-Jacques Charaudeau, Cottens (CH); Pierre Alain Magne, Belfaux (CH)

(73) Assignee: Michelin Recherche et Technique S.A., Granges-Paccot (CH)

(*) Notice: Subject to any disclaimer, the term of this patent is extended or adjusted under 35 U.S.C. 154(b) by 164 days.

(21) Appl. No.: 09/975,635

(22) Filed: Oct. 11, 2001

(65) Prior Publication Data

US 2002/0084599 A1 Jul. 4, 2002

(30) Foreign Application Priority Data

Oct. 11, 2000 (FR) .......................................... 00 13106

(51) Int. Cl.$^7$ .............................................. B60G 23/00
(52) U.S. Cl. ........................................................ 701/37
(58) Field of Search ............................ 701/37, 38, 48; 280/5.5, 5.585, 5.512, 5.515

(56) References Cited

U.S. PATENT DOCUMENTS

| | | |
|---|---|---|
| 4,973,078 A | 11/1990 | Barthelemy et al. |
| 4,981,309 A | 1/1991 | Froeschle et al. |
| 5,027,048 A | 6/1991 | Masrur et al. ............... 318/806 |
| 5,028,073 A | 7/1991 | Harms et al. |
| 5,060,959 A | 10/1991 | Davis et al. |
| 5,066,041 A | 11/1991 | Kindermann et al. |
| 5,071,157 A | 12/1991 | Majeed ........................ 280/707 |
| 5,091,679 A | 2/1992 | Murty et al. |
| 5,096,219 A | 3/1992 | Hanson et al. ............... 280/707 |
| 5,475,596 A | 12/1995 | Henry et al. ........... 364/424.05 |
| 5,719,790 A | 2/1998 | Lohrenz et al. |
| 5,740,039 A | 4/1998 | Hirahara et al. |
| 6,032,770 A | 3/2000 | Alcone et al. .............. 188/378 |
| 6,113,119 A | 9/2000 | Laurent et al. |
| 6,161,844 A | 12/2000 | Charaudeau et al. |
| 6,298,294 B1 | 10/2001 | Murata et al. ................. 701/37 |

FOREIGN PATENT DOCUMENTS

| | | |
|---|---|---|
| EP | 0415780 | 3/1991 |
| EP | 0878333 | 5/1998 |
| EP | 0878332 | 11/1998 |
| JP | 7149130 | 6/1995 |
| WO | 9967100 | 12/1999 |

OTHER PUBLICATIONS

U.S. patent application Ser. No. 09/975,656, Charaudeau et al., Suspension Device Having a Trim Corrector, filed Oct. 11, 2001.
Search Report for FR 0013106.

*Primary Examiner*—Yonel Beaulieu
(74) *Attorney, Agent, or Firm*—Baker Botts L.L.P.

(57) ABSTRACT

A vehicle suspension device for controlling the vertical deflection between a suspended mass and a non-suspended mass, including an elastic link mounted between the suspended mass and the non-suspended mass, the said elastic link embodying a spring, a reversible electric actuator acting in parallel with the spring for controlling the relative-deflection movements between suspended mass and non-suspended mass, $Z_{cr}$ being the distance between the suspended mass and the non-suspended mass, and means for controlling the electric actuator, from an observed variation of the distance $Z_{cr}$ between the suspended mass and the non-suspended mass due to a deflection of the elastic link, in order that the electric actuator develops a force F having a mass compensation component $F_1 = C_a.M_r.A_{cr}$ oriented like the acceleration $A_{cr}$ of the deflection of the non-suspended mass with respect to the suspended mass, with $M_r$ being the non-suspended mass and $C_a$ a coefficient, and having a damping component $F_2 = -C_v.V_{cr}$ opposing the speed $V_{cr}$ of the said deflection, $C_v$ being a coefficient.

18 Claims, 6 Drawing Sheets

SUSPENSION DEVICE HAVING ELECTRIC ACTUATOR AND SPRING IN PARALLEL

BACKGROUND OF THE INVENTION

The present invention concerns the field of suspensions. In particular, it relates to the suspension of vehicles, for example passenger cars. More precisely, it relates to the means used to permit the deflection between two points (a suspended point, for example linked to the body or the chassis of a car, that is to say to the suspended mass, and a non-suspended point, for example fixed to a suspension arm or a wheel carrier, that is to say fixed to the non-suspended mass) while striving to reduce the variations of the force developed by the suspension which are experienced by the suspended point.

It is known that the suspension of a vehicle comprises constructional arrangements by means of which the displacement of a wheel or of wheels of an axle with respect to the body (or with respect to the chassis if the vehicle is provided with a chassis, or between body and chassis if appropriate) is guided, and it comprises means controlling the deflection of each wheel (a wheel is a member belonging to non-suspended members) with respect to the body (any point situated on the body is referred to as a "suspended" point), in order to bear the load while maintaining a certain ground clearance of the vehicle (this is the function of a spring) and in order to prevent the maintenance of the oscillations arising between suspended and non-suspended points following a disturbance (this is the function of a damper).

A spring is calculated to bear the load of the vehicle while maintaining a sufficient ground clearance from the vehicle. Due to the damping function, the wheels equipped with tires tend always to remain in contact with the road when the suspension is stressed by the irregularities of the road. A damper prevents the maintenance of the oscillations arising following a disturbance, in particular the oscillations of the wheel itself, which the tire is unable to attenuate sufficiently rapidly by itself It is known that the design of a suspension is characterized by the search for a compromise between objectives which have a reputation for being, at least to a large extent, contradictory: comfort and handling. Numerous effort have been made to find increasingly favorable compromises. In the state of the art, suspensions are known which are referred to as active or semi-active suspensions and whose control has now been made possible by progress in electronics. In such suspensions, commands are transmitted by electric or electrohydraulic means in order to modify the flexibility and/or damping characteristics of the suspension in real time. This leads to the addition of an electronic regulation stage, with its sensors and means for calculation, to conventional mechanical, pneumatic or hydraulic devices, as well as solenoid valves or servovalves, in order to transmit the commands for changing the characteristics to the mechanical members responsible for the functioning of the suspension. For example, a valve in a damper has to be opened or closed in order to modify the dissipation of energy which it brings about.

Also known are numerous proposals for active suspensions, such as those described in the patents or patent applications U.S. Pat. No. 5,060,959, U.S. Pat. No. 5,028,073, U.S. Pat. No. 5,066,041, U.S. Pat No. 5,740,039 or EP 0 878 333, to mention only some of them. The diversity of the constructional arrangements and of the control laws proposed compared with the very small number of active suspensions on the market gives an idea of the difficulty of controlling the suspensions effectively. The state of the art comes up against the choice of control parameters, and the correct utilization of a multitude of signals which are thought to be needed for correctly capturing the attitude of a vehicle.

In a particular embodiment proposed in the patent application EP 0 878 333, a regulating parameter called $\alpha$ is controlled in real time in order to adjust the suspension between a pure contour-following or spring-accompanying behaviour ($\alpha=1$) and a pure damping behaviour ($\alpha=0$). This mode of operation is useful in particular for damping the vibrations of a tire. It is proposed to detect the occurrence of a resonance of the tire in order to rapidly give $\alpha$ a value sufficiently below 1 (for example according to a law of linear variation as a function of the amplitude) so as to damp the vibrations of the non-suspended mass.

SUMMARY OF THE INVENTION

The aim of the invention is to propose another approach, which makes the detection of a resonance of the non-suspended mass much less useful, for obtaining a high level of operational safety of the vehicles and great comfort.

The invention proposes a suspension device, for controlling the vertical deflection between a suspended mass and a non-suspended mass, comprising an elastic link mounted between the suspended mass and the non-suspended mass, the said elastic link including a spring and comprising a reversible electric actuator acting in parallel with the spring for controlling the relative-deflection movements between suspended mass and non-suspended mass, $Z_{cr}$ being the distance between the suspended mass and the non-suspended mass, the said device comprising means for controlling the electric actuator in order, from an observed variation of the distance $Z_{cr}$ between the suspended mass and the non-suspended mass, due to a deflection of the elastic link, that the electric actuator develops a force F having a mass compensation component $F_1=C_a.M_r.A_{cr}$ oriented like the acceleration $A_{cr}$ of the deflection of the non-suspended mass with respect to the suspended mass, with $M_r$ being the non-suspended mass and $C_a$ a coefficient, and having a damping component $F_2=-C_v.V_{cr}$ opposing the speed $V_{cr}$ of the said deflection, $C_v$ being a coefficient.

By convention, "revolving assembly" is the term used for all the members which, for a given suspension configuration, are customarily arranged in the non-suspended mass. For a suspension of the type described in the application EP 0 878 332, the non-suspended mass comprises—besides all the members rotating about the axis of rotation of the wheel—the wheel carrier, the bar, the brake calliper and the electric drive motor (the suspension motor is not part of it). The invention proposes to develop a force component in the electric actuator which takes account of the non-suspended mass, thereby tending to prevent the accumulation of energy therein.

In addition and with preference, the electric actuator is controlled so as to develop a spring-accompanying component, creating a force oriented like the relative displacement between body and wheel, so as to cancel out the force variations due to the deflection variations. The electric actuator of the device according to the invention is, in this preferable case, controlled by the said control means so that the electric actuator develops a force F additionally having a spring-accompanying component $F_3=C_p.K.Z_{cr}$, oriented opposite to the variation of the force developed by the spring and due to the variation of the distance $Z_{cr}$, K being the stiffness of the spring and $C_p$ a coefficient.

The role of the electric actuator is to limit as far as possible the force variations experienced by the body. If there were no force variation, there would be no acceleration, and thus no movement of the body vertically, so that the comfort would be very great. The electric actuator continuously acts as a spring corrector so as to radically reduce the force variations which the spring would otherwise impose on the suspended mass under the action of external disturbances, while preventing an unacceptable accumulation of energy in the non-suspended mass. The function of this spring corrector consists in modifying the reaction force which the spring would have naturally developed in response to a disturbance by applying a correction strategy aiming to obtain the best-possible comfort while preserving the safety.

The invention will be better understood from the following description of an example given on a non-limiting basis, with reference to the appended drawings.

DETAILED DESCRIPTION OF THE INVENTION

Figure 1:
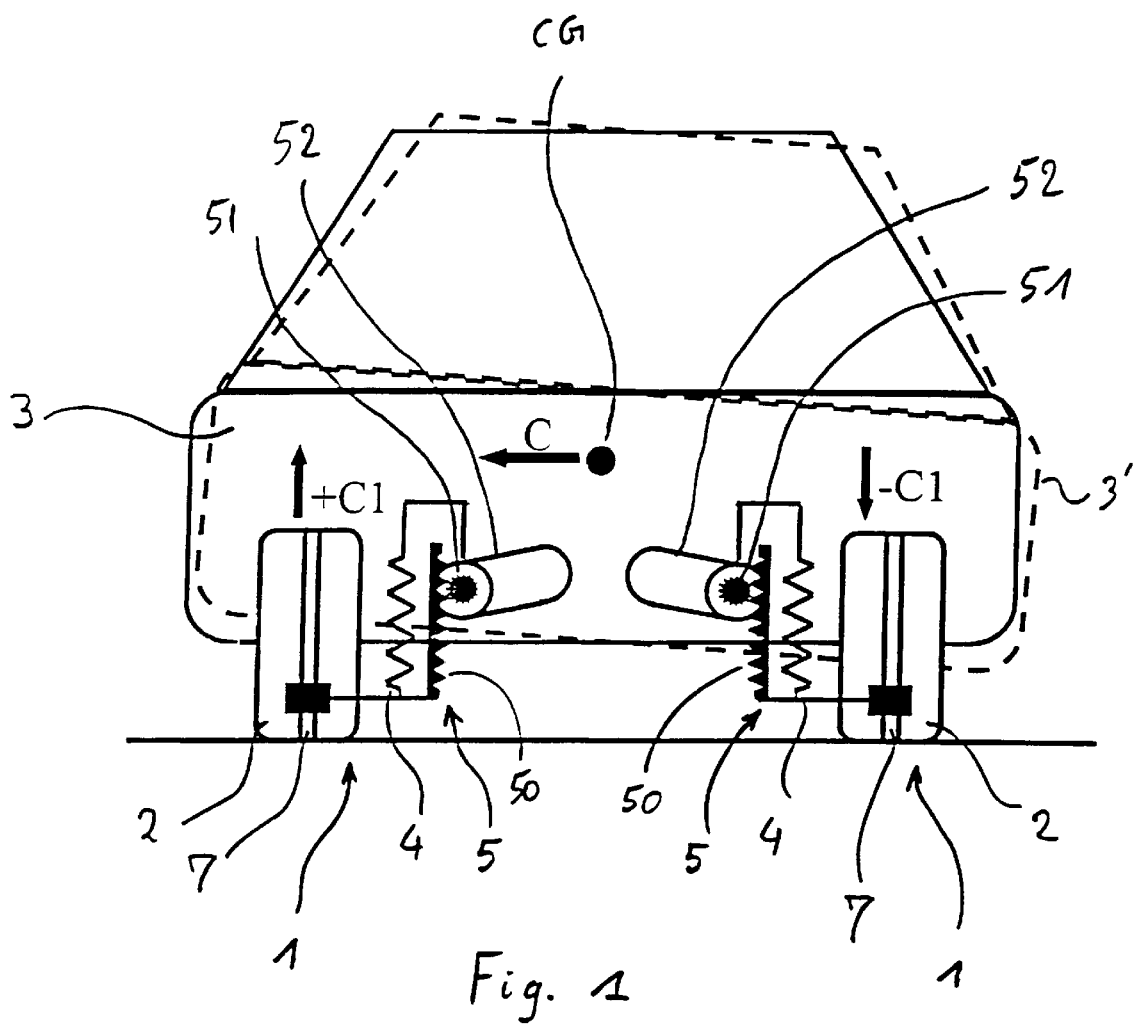
FIG. 1 shows a vehicle equipped with a suspension according to the invention.
Figure 2:
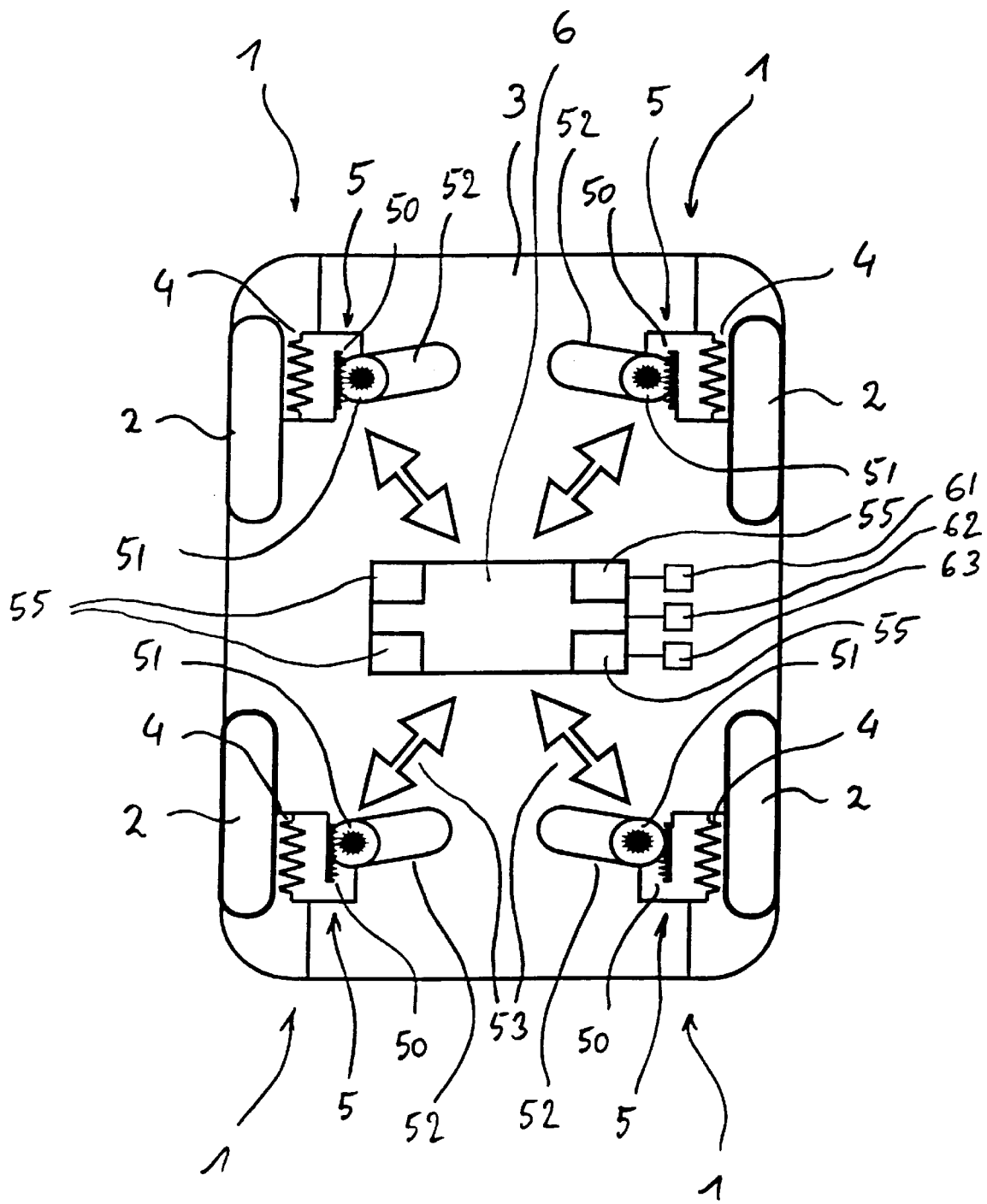
FIG. 2 is a diagram showing the layout of the main elements of the invention on a vehicle.

In FIG. 1 there can be seen in front elevation a four-wheeled passenger car equipped with elastic links 1 mounted between the wheels 2 and the body 3. The four elastic links 1 mounted between the wheels 2 and the body 3 of the vehicle can be seen in FIG. 2. Each elastic link comprises a vertical guide slot 7, a helical spring 4 and an electric actuator 5 which is mounted in parallel. The electric actuator 5 comprises a rack 50 fixed to the non-suspended part of the suspension system. An electric motor 52 is fixed by its frame to the suspended part of the suspension system. A pinion 51 is mounted on the rotor of the motor and is engaged with the rack 50. For more details on a possible construction comprising guidance of the wheel plane by a vertical guide slot, reference should be made to the patent application EP 0 878 332. Of course, other principles used for linking a revolving assembly to a body may be adopted and are compatible with the use of an electric actuator and a spring which are mounted in parallel.

The body 3, represented in continuous lines, is not subjected to rolling. This is its natural attitude when travelling in a straight line. The body 3' in contrast exhibits a slight overcompensation of the rolling, and this aspect will be discussed in more detail hereinbelow.

It is known that, in order to obtain a given force in an electric actuator 5 as described above, the motor must develop a specific torque. The control in order to obtain a specific force in the electric actuator 5 thus amounts to controlling the torque of the motor. In a very particularly advantageous variant, a Permanent Magnet Synchronous Motor 52 is used. This type of motor comprises, owing to its construction, rotor position sensors used to control the motor. When used for this invention, these sensors measure in fact the variation of the distance between the wheel 2 and the body 3. The information coming from the sensors inside the motor reaches a unit 55 for the individual control of the wheel, via the channels 53.

The unit 55 comprises the electronic means for utilising the information coming from the said sensors inside the motor in accordance with a control strategy such that the electric actuator develops a force $F = C_a \cdot M_r \cdot A_{cr} - C_v \cdot V_{cr} + C_p \cdot K \cdot Z_{cr}$. The force F thus comprises a mass compensation component weighted by the coefficient $C_a$, a damping component weighted by the coefficient $C_v$ and a spring-accompanying component weighted by the coefficient $C_p$. The coefficients can be chosen experimentally in accordance with starting values proposed below.

FIGS. 3a to 5c make it possible to visualize the effect of the various components. In these figures, the contour of the road has been represented, this being equivalent to the variation (in ordinates) of the level of the ground as a function of time (in abscissae) assuming that the vehicle is travelling at constant speed. This is the curve P. The horizontal axis represents a reference determined by the average level of the road. The ordinates are the deviations from this average level. The contour of the road thus comprises a first level stretch without deviation from the average level, followed by a bump with a trapezoidal contour, followed by a second level stretch without deviation from the average level. All the figures are concerned with surmounting the same obstacle, namely an elevation in the ground level followed by a return to the initial level (isolated bump). In all the figures, the curve $Z_r$ shows the displacement of the wheel (that is to say the non-suspended mass) which results from surmounting the obstacle for a suspension having the characteristics illustrated by each of the figures respectively. In all the figures, the curve $Z_c$ illustrates the displacement of the body, that is to say the suspended mass, which results from surmounting the obstacle for a suspension having the characteristics illustrated by each of the figures respectively. Finally, in all the figures, the curve F illustrates the development of the force in the electric actuator 5 which results from surmounting the obstacle for a suspension having the characteristics illustrated by each of the figures respectively.

Figure 3A:
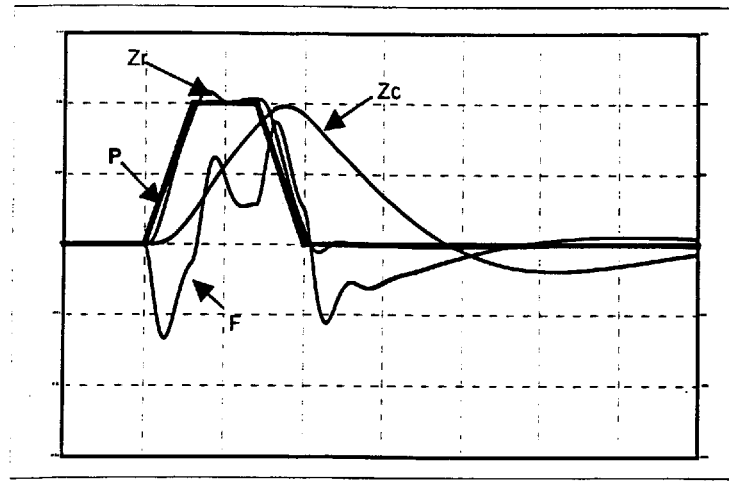
FIGS. 3a, 3b and 3c illustrate, as a function of time and in synchronism, the development of the contour of the road, which causes the stressing of the suspension, the resultant displacement of the non-suspended mass, the resultant displacement of the suspended mass, and the development of the force in the electric actuator, for several combinations of the coefficients $C_a$, $C_v$, and $C_p$, in which $C_a$ is increased progressively from FIG. 3a to FIG. 3c, $C_v$ and $C_p$ being constant.
Figure 3B:
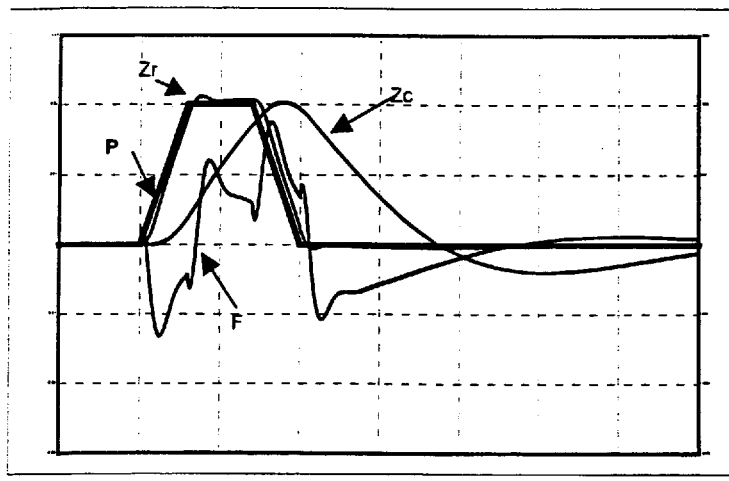
Figure 3C:
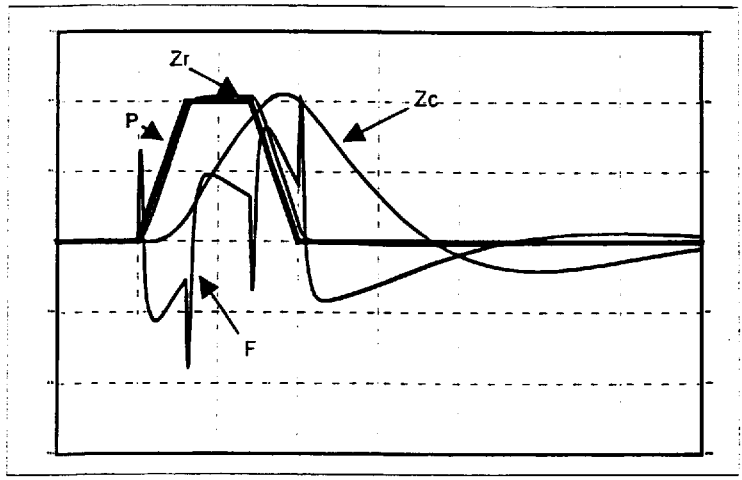

FIGS. 3a, 3b and 3c illustrate the effect of the compensation of the non-suspended mass by variation of the coefficient $C_a$, the coefficients $C_v$ and $C_p$ having constant values. The coefficient $C_a$ is zero in FIG. 3a. Favorable performances have been observed by compensating up to about 50% of the non-suspended mass. The intermediate value in FIG. 3b corresponds to a compensation of about 30% of the non-suspended mass. The value in FIG. 3c corresponds to a compensation of about 70% of the non-suspended mass. The disturbance imposed by the contour of the road and the force reaction F results in a displacement of the non-suspended mass illustrated by the curve $Z_r$, and a displacement of the body illustrated by the curve $Z_c$. It can be seen that the displacement of the non-suspended mass follows the contour of the road much more closely when the coefficient $C_a$ is not zero. When a greater weight is adopted for this component, there is virtually no more oscillation of the wheel after passing the obstacle, which is very favorable to safety. It can also be seen that when the weight of this component increases, the movement to which the body is subjected is substantially unaffected. In conclusion, the invention makes it possible to increase safety without impairing comfort.

Figure 4A:
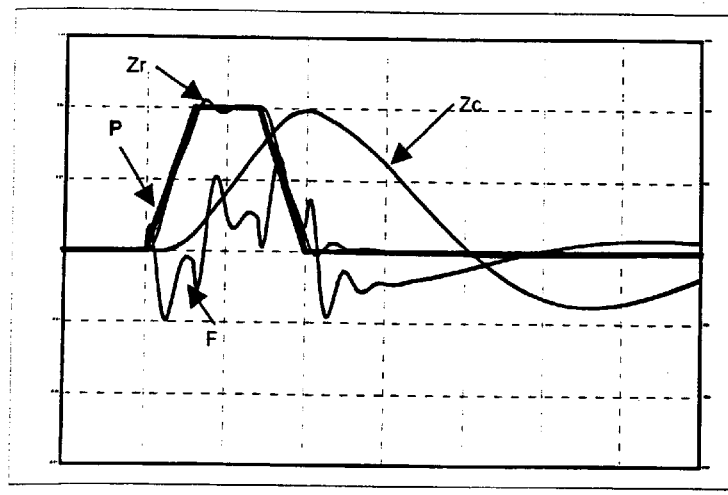
FIGS. 4a, 4b and 4c illustrate the same developments for other combinations of the coefficients $C_a$, $C_v$, and $C_p$, in which $C_a$ is increased progressively from FIG. 4a to FIG. 4c, $C_a$ and $C_p$ being constant.
Figure 4B:
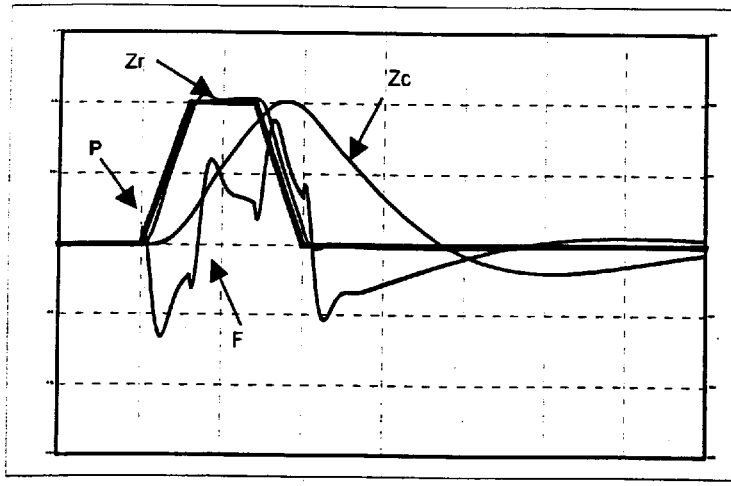
Figure 4C:
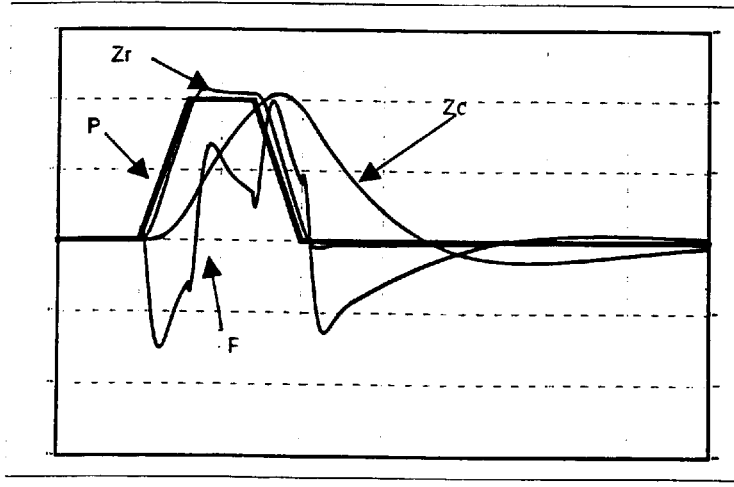

FIGS. 4a, 4b and 4c illustrate the effect of the damping by variation of the coefficient $C_v$, the coefficients $C_a$ and $C_p$ having constant values. The coefficient $C_v$ is low in FIG. 4a, is of intermediate value in FIG. 4b, and of higher value in FIG. 4c. In order to choose an initial value of $C_v$, the criterion employed is that the amplitude of the second oscillation is attenuated by 90% with respect to the amplitude of the first. It can be seen from the curves F that a force is established in the electric actuator 5 which increases in proportion to the increase in the damping. The disturbance imposed by the contour of the road and the force reaction F result in a displacement of the non-suspended mass illustrated by the curve $Z_r$, and a displacement of the body illustrated by the curve $Z_c$. It can be seen that the displacement of the non-suspended mass follows the contour of the road more closely for the two highest values of the coefficient $C_v$. There is virtually no oscillation of the wheel after going over the obstacle, which is very favorable to safety. In contrast, it can be seen that, if the amplitude of the movement of the body is hardly affected, the slope of the curve is steeper and steeper, a sign of a much greater acceleration, which is detrimental to comfort.

Figure 5A:
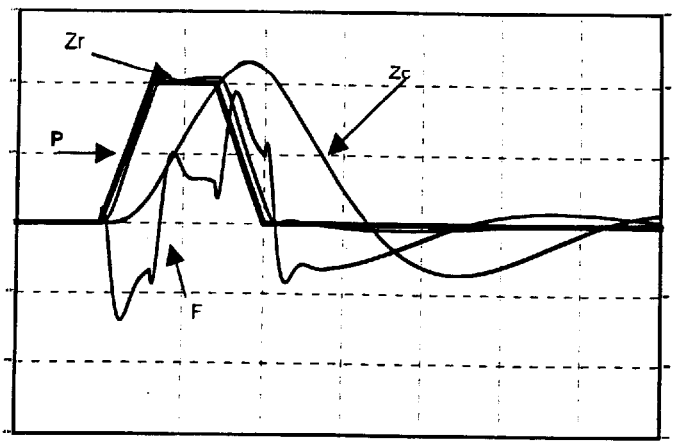
FIGS. 5a, 5b and 5c illustrate the same developments for other combinations of the coefficients $C_a$, $C_v$ et $C_p$, in which $C_p$ is increased progressively from FIG. 5a to FIG. 5c, $C_v$ and $C_a$ being constant.
Figure 5B:
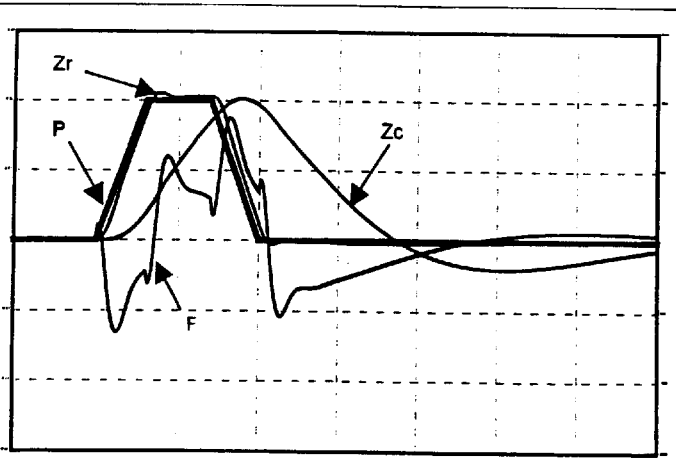
Figure 5C:
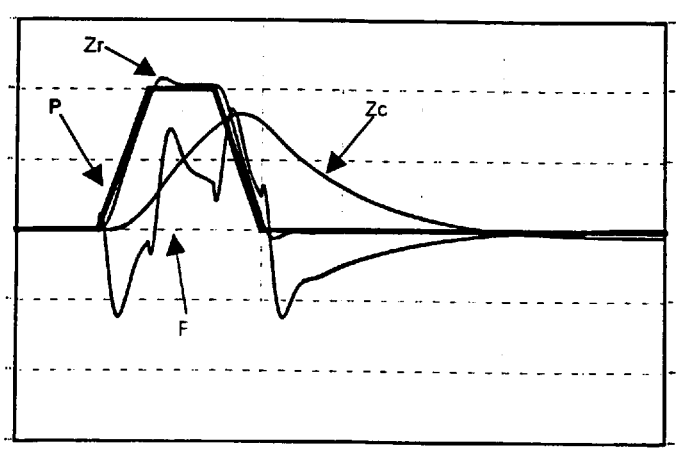

FIGS. 5a, 5b and 5c illustrate the effect of the compensation of the spring by modifying its apparent stiffness as explained in the patent application EP 0 878 333, by variation of the coefficient $C_p$, the coefficients $C_a$ and $C_v$ having constant values. The coefficient $C_p$ is zero in FIG. 5a. The coefficient $C_p$ is 1 when the electric actuator functions as a pure contour follower, in the sense given to this expression in the aforementioned patent. This coefficient is not chosen independently of the spring. The greater the stiffness of a spring which is chosen, the more advisable it is to give weight to this component if it is desired to preserve the comfort. Favorable performances have been observed up to about 80% of a behaviour as a pure contour follower. The coefficient is 0.4 in FIG. 5b and 0.8 in FIG. 5c. It can be seen from the curves F that, as soon as the wheel encounters the obstacle, a force is established in the electric actuator 5 which compresses the spring 4, thereby allowing the wheel 2 to climb up the obstacle while limiting the acceleration to which the body 3 is subjected. The disturbance imposed by the contour of the road and the force reaction F result in a displacement of the non-suspended mass illustrated by the curve $Z_r$, and a displacement of the body illustrated by the curve $Z_c$. It can be seen that the displacement of the non-suspended mass follows the contour of the road a little less closely when the coefficient $C_p$ is not zero. A slight oscillation of the non-suspended mass occurs after the initial compression phase. It can also be seen, especially in FIG. 5c, that when the weight of this component is very great, the body is subjected to a movement of lower amplitude, and especially that the slope of the curve is less steep, a sign of a much lower acceleration, which is very favorable to comfort.

In conclusion, FIGS. 3b (configurations identical to FIGS. 4b and 5b) and 5c illustrate good combinations of values of the coefficients. It is, however, difficult to suggest combinations having universal value. It is advisable to proceed experimentally in order to choose what is best suited to a given vehicle. But unlike conventional suspensions, the search for the best solution is done here by simple programming. It is thus much quicker, more efficient and more economical to scan a large number of combinations of characteristics since there is no mechanical part to be changed.

Figure 6:
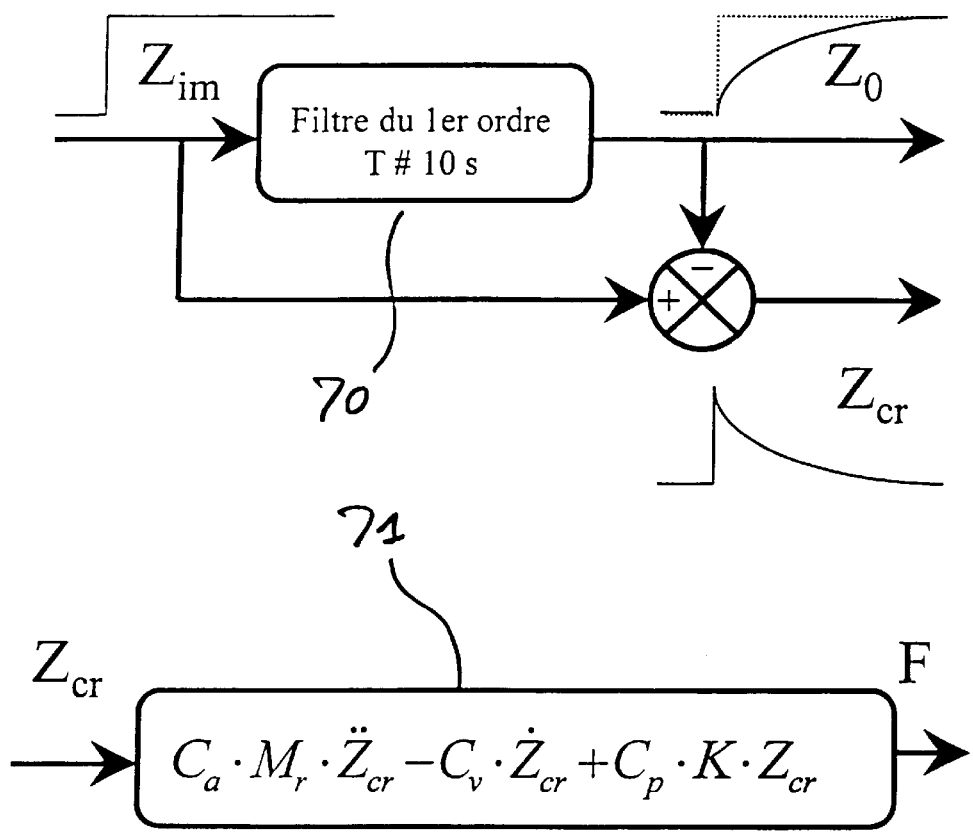
FIG. 6 represents the invention in the form of a block diagram.

An explanation will now be given of a (non-limiting) possibility for implementing a relaxation of the force developed in the electric actuator. The control unit 55 receives the information on the measured instantaneous position "$Z_{im}$" of the electric actuator (see FIG. 6) from the sensors inside the motor, via the channel 53. A functional block 70 of the unit 55 continuously recalculates the equilibrium position, designated by $Z_o$, in which the force of the spring 4 exactly compensates the static load of the body. This equilibrium position $Z_o$ is obtained, for example, by averaging the value $Z_{im}$ over a relatively long period of time (for example of the order of 10 seconds). From the information $Z_{im}$ and $Z_o$, it is possible to deduce immediately and by the difference the deviation $Z_{cr}=Z_{im}-Z_o$ from the equilibrium position. The unit 55 continuously calculates the force F to be exerted, in accordance with a predetermined sampling period (for example every millisecond). In the course of successive calculations, the unit 55 progressively adapts the force of the electric actuator to the deflection deviations of a permanent nature, in order to progressively cancel out the correction due to these deviations. It is this that provides a certain relaxation.

Then, from the value of $Z_{cr}$, of its first derivative (speed) and of its second derivative (acceleration), a functional block 71 calculates the value of F as explained above, taking account of the choices made for the coefficients.

In a highly advantageous manner, it is possible, through an overall control stage of the set of the suspension systems of the vehicle, to provide an active compensation of the rolling and the pitch, well-known phenomena of trim variations which are detrimental both to comfort and safety.

In FIG. 1, it was seen that the body 3 represented in continuous lines is not subjected to rolling. This is its natural attitude when travelling in a straight line. Note that the center of rolling of the body is situated below the center of gravity for a suspension providing guidance of the wheel planes by a vertical guide slot according to the patent application EP 0 878 332. If a centrifugal force C acting at the center of gravity CG occurs, outside any active correction, the body will tilt towards the outside of the bend by an angle of rolling dependent on the centrifugal force and the flexibility of the suspensions.

The suspension device according to the invention comprises means for evaluating such a stress which is not vertical and oriented parallel to the straight line joining the centers of the areas of contact on the ground of the wheels under consideration, here belonging to an axle since the case being explained is that of rolling. This phenomenon is opposed by developing in the electric actuators 5 a correction component $+C_1$ at the outside of the bend and $-C_1$ at the inside of the bend. By acting on the amplitude of this correction, it is possible to limit the angle of rolling, or even to overcompensate it as shown by the body 3' represented in broken lines. Rolling and pitch are both referred to hereinbelow as "trim variation".

For each suspension system, besides an individual control provided by a control unit 55 making it possible to create in the said electric actuator 5 a force having at least a non-suspended mass compensation component, a damping component and, if appropriate, a spring correction component, as explained above, a trim correction component $F_4$ is added. For example, when considering a vehicle comprising at least two suspension systems forming an axle, the said suspension systems being mounted on either side of the median plane of symmetry of the vehicle, the control is programmed so as to create a trim correction torque which opposes the rolling. Or, when considering a vehicle comprising at least two suspension systems, including a front suspension system and a rear suspension system, the control is programmed so as to create a trim correction torque which controls the pitch. Of course, the invention applies to a vehicle comprising at least four suspension systems forming a front axle and a rear axle, the control being programmed so as to create a trim correction torque which controls both the roll and the pitch.

The control of the trim correction components is centralized since it concerns the equilibrium of the vehicle as a whole. It is provided by a central unit 6. Preferably, for a vehicle with at least four wheels, the central unit 6 provides at least a correction of the roll. Advantageously, the central unit 6 can provide or additionally provide a correction of the pitch of the vehicle.

Of course, if both the roll and the pitch are compensated, each of the said suspension systems is capable of receiving from the means for controlling the electric actuators a force value which is the resultant of a contribution for the correction of the roll and of a contribution for the correction of the pitch. For each electric actuator, the overall trim correction component is the algebraic sum of a contribution relating to the roll and a contribution relating to the pitch. In the case of pure roll (no pitch) or pure pitch (no roll), the correction components are equal absolute values and are oriented in opposite directions to one another on either side of the vehicle.

Let us continue with the example of pure roll. The said roll correction components are equal absolute values and are oriented in opposite directions to one another in each axle (an axle constituting a group of suspension systems), so as to apply an anti-roll torque to the body 3. The roll can be compensated partially (less energy needed), or totally (better comfort, better functioning of the tires), or may even be overcompensated as mentioned above, in order to improve more radically still the operation of a vehicle such as a four-wheeled passenger car. The greater the compensation, the more it is necessary to be able to develop a large torque in the motors 52, and to maintain it for the time which the transverse (or longitudinal) stresses last, the latter being much longer than the stresses resulting from the bumpy nature of the road, calling for the damping component, which will be discussed hereinbelow.

It is possible to use sensors 61, 62, 63 such as, for example, accelerometers connected to the body to evaluate a non-vertical stress. The stress may be the transverse acceleration and/or the yaw rate (resulting in roll). It is also possible to evaluate the longitudinal acceleration (resulting in pitch). This or these evaluations make it possible to develop an appropriate trim correction torque or appropriate trim correction torques.

As a variant, it is possible to use sensors for evaluating parameters indicating the vehicle driving conditions. These are, for example, a sensor for the angle of the steering wheel, the brake pressure, the action on the accelerator, and a vehicle speed sensor. This may make it possible to anticipate the instant at which accelerations parallel to the ground (transverse, longitudinal acceleration) occur. In this case, it is possible to use control strategies observing those of the driver's actions, estimating the probable consequences on the roll (and on the pitch), and the appropriate trim correction is determined.

It is of course possible to bring about a variation of the trim of the suspended mass in response to any type of command. For example, even in the absence of longitudinal acceleration applied to the body, the control means can be controlled so that a torque overcompensating a transverse acceleration is accompanied by a slight voluntary dive of the vehicle. This example is cited only to make it clear that an infinite number of active controls are possible.

Advantageously, the invention also makes it possible to control the distribution between the front axle and the rear axle of the said roll correction components in real time and very easily. Given an overall anti-roll torque acting on the body, the greater the roll correction share achieved by the rear axle, the more the vehicle will oversteer, and vice versa. The yaw inertia of the vehicle, for example at the start of a bend, can be overcome by very briefly adopting a greater anti-roll share at the rear, and then the path of the vehicle can be stabilized by giving it a more understeering handling by an anti-roll share becoming greater at the front. By comparing the path of the vehicle desired by the driver with the effective path of the vehicle, in the manner of the stabilizing devices known under the designation "ESP", a stabilizing effect can be obtained by acting dynamically on the distribution of the roll correction torque between the front and the rear of the vehicle. The invention thus applies, in a particular embodiment, to a vehicle comprising at least one front axle and one rear axle each having two suspension systems mounted on either side of the median plane of symmetry of the vehicle, the said control means controlling the distribution between the front axle and the rear axle of the said trim correction components opposing the roll in real time.

Similarly, the pitch correction of a body of a 4-wheeled passenger car depends on an overall pitch correction torque, and the correction components acting on the pitch can be distributed on either side of the plane of symmetry of the vehicle, if appropriate by a real-time control. The invention thus applies, in a particular embodiment, to a vehicle comprising at least one front axle and one rear axle each having two suspension systems mounted on either side of the median plane of symmetry of the vehicle, the said control means controlling the distribution on either side of the median plane of symmetry of the vehicle of the said correction components acting on the pitch in real time.

Finally, it should be pointed out, as far as the coefficients $C_a$, $C_v$ and $C_p$ are concerned, that these can be adapted in real time in order, for example, to create the effect of a variable flexibility (dynamic adaptation of $C_p$), a variable damping (dynamic adaptation of $C_v$), or to reduce the accompaniment of the spring and/or the compensation of the non-suspended mass (dynamic adaptation of $C_p$ and/or $C_a$) or if, for example, a trim correction component is introduced (see above), the value of the coefficients $C_p$ and $C_a$ can be reduced, on account of the inescapably limited nature of the electric power available, in order to give priority to the trim correction.

As a final remark, it should be pointed out, as already indicated in the patent application EP 0 878 333, that a ground clearance correction (that is to say a correction of the height with respect to the ground) of the body could also be made, for example in order to obtain a constant ground clearance irrespective of the static load of the vehicle. But in this case it must be accepted that energy is continuously consumed in order that the fraction of the load exceeding the dead weight of the vehicle is borne by the electric actuator. The reason is that this assumes that a fraction of the trim correction component continuously opposes the said load exceeding the dead weight, which is not incompatible with the principle according to the invention, but requires the establishment of a constant current component in the electric actuators. However, it seems preferable to do without height correction, or to reserve the height correction function for a device other than the electric actuator, this other device acting with a great time constant and consuming energy only during the correction phase.

We claim:

1. A vehicle suspension device for controlling the vertical deflection between a suspended mass and a non-suspended mass, comprising an elastic link mounted between the suspended mass and the non-suspended mass, the said elastic link including a spring and comprising a reversible electric actuator acting in parallel with the spring for controlling the relative-deflection movements between suspended mass and non-suspended mass, $Z_{cr}$ being the distance between a point on the suspended mass and a point on the non-suspended mass, the said device comprising means for controlling the electric actuator so that, from an observed variation of the distance $Z_{cr}$, due to a deflection of the elastic link, the electric actuator develops a force F having a mass compensation component $F_1=C_a.M_r.A_{cr}$ oriented in the direction of the acceleration $A_{cr}$ of the deflection of the non-suspended mass with respect to the suspended mass, with Mr being the non-suspended mass and $C_a$ a coefficient, and having a damping component $F_2=-C_v.V_{cr}$ opposing the speed $V_{cr}$ of the said deflection, $C_v$ being a coefficient.

2. A device according to claim 1, in which the electric actuator is controlled by the said control means so that it develops a force F additionally having a spring-accompanying component $F_3=C_p.K.Z_{cr}$, oriented opposite to the variation of the force developed by the spring and due to the variation of the distance $Z_{cr}$ caused by the said deflection, K being the stiffness of the spring and $C_p$, a coefficient.

3. A device according to claim 1, in which the value of the coefficients is adapted in real time in accordance with parameters indicating vehicle driving conditions.

4. A device according to claim 2 in which the value of the coefficients is adapted in real time in accordance with parameters indicating vehicle driving conditions.

5. Suspension device according to claim 1, in which the device calculates an equilibrium position $Z_o$ for the distance between the suspended mass and the non-suspended mass, in which the force of the spring exactly compensates the suspended mass by averaging the instantaneous absolute value $Z_{im}$ of the relative position of the non-suspended mass with respect to the suspended mass, and recalculates $Z_{cr}=Z_{im}-Z_o$.

6. A device according to claim 1, in which the electric actuator comprises a Permanent Magnet Synchronous Motor and in which the control means determine the variation of the relative position between suspended point and non-suspended point entirely from a measurement of the position variation delivered by sensors integrated in the electric motor.

7. A device for the overall suspension of a vehicle comprising a suspended mass and at least one group of two suspension systems comprising a suspension device for controlling the vertical deflection between a suspended mass and a non-suspended mass, said device comprising an elastic link mounted between the suspended mass and the non-suspended mass, the said elastic link including a spring, a reversible electric actuator acting in parallel with the spring for controlling the relative-deflection movements between suspended mass and non-suspended mass, $Z_{cr}$ being the distance between a point on the suspended mass and a point on the non-suspended mass, means for controlling the electric actuator so that, from an observed variation of the distance $Z_{cr}$, due to a deflection of the elastic link, the electric actuator develops a force F having a mass compensation component $F_1=C_a.M_r.A_{cr}$ oriented in the direction of the acceleration $A_{cr}$ of the deflection of the non-suspended mass with respect to the suspended mass, with Mr being the non-suspended mass and $C_a$ a coefficient, and having a damping component $F_2=-C_v.V_{cr}$ opposing the speed $V_{cr}$ of the said deflection, $C_v$ being a coefficient, in which the electric actuators are controlled by the said control means so that they develop a force F additionally having a trim correction component $F_4$, the said trim correction component applying a trim correction torque to the said body.

8. A device according to claim 7, in which the control means comprise means for evaluating a non-vertical stress applied to the suspended mass and likely to cause a variation of the trim of the suspended mass and for calculating the trim correction component.

9. A device according to claim 8, in which the said at least two suspension systems form an axle, the said suspension systems being mounted on either side of the median plane of symmetry of the vehicle, so that the said trim correction torque opposes the roll.

10. A device according to claim 8, in which the said at least two suspension systems comprise a front suspension system and a rear suspension system, so that the said trim correction torque opposes the pitch.

11. A device according to claim 8 for a vehicle comprising at least four suspension systems forming a front axle and a rear axle, in which the said trim correction torque opposes both the roll and the pitch.

12. A device according to claim 8 for a vehicle comprising at least one front axle and one rear axle each having two suspension systems mounted on either side of the median plane of symmetry of the vehicle, the said control means controlling the distribution between the front axle and the rear axle of the said trim correction components opposing the roll in real time.

13. A device according to claim 8 for a vehicle comprising at least one front axle and one rear axle each having two suspension systems mounted on either side of the median plane of symmetry of the vehicle, the said control means controlling the distribution on either side of the median plane of symmetry of the vehicle of the said correction components opposing the pitch in real time.

14. A device according to claim 7 in which the electric actuator is controlled by the said control means so that it develops a force F additionally having a spring-accompanying component $F_3=C_p.K.Z_{cr}$, oriented opposite to the variation of the force developed by the spring and due to the variation of the distance $Z_{cr}$ caused by the said deflection, K being the stiffness of the spring and $C_p$ a coefficient.

15. A device according to claim 7, in which the value of the coefficients is adapted in real time in accordance with parameters indicating vehicle driving conditions.

16. A device according to claim 14, in which the value of the coefficients is adapted in real time in accordance with parameters indicating vehicle driving conditions.

17. A suspension device according to claim 7, in which the device calculates an equilibrium position $Z_o$ for the distance between the suspended mass and the non-suspended mass, in which the force of the spring exactly compensates the suspended mass by averaging the instantaneous absolute value $Z_{im}$ of the relative position of the non-suspended mass with respect to the suspended mass, and recalculates $Z_{cr} = Z_{im} - Z_o$.

18. A device according to claim 7, in which the electric actuator comprises a Permanent Magnet Synchronous Motor and in which the control means determine the variation of the relative position between suspended point and non-suspended point entirely from a measurement of the position variation delivered by sensors integrated in the electric motor.

* * * * *

UNITED STATES PATENT AND TRADEMARK OFFICE
CERTIFICATE OF CORRECTION

| | | |
|---|---|---|
| PATENT NO. | : 6,708,094 B2 | Page 1 of 1 |
| APPLICATION NO. | : 09/975635 | |
| DATED | : March 16, 2004 | |
| INVENTOR(S) | : Jean-Jacques Charaudeau et al. | |

It is certified that error appears in the above-identified patent and that said Letters Patent is hereby corrected as shown below:

On the Title Page, change Assignee to read:
(73)     Assignee:  Conception et Development Michelin S.A.
                    CH-1762 Gavisiez, Switzerland Signed and Sealed this Fifth Day of December, 2006

JON W. DUDAS
*Director of the United States Patent and Trademark Office*